Nov. 7, 1967  W. NOWELL ETAL  3,351,332
CIRCLE CUTTING MACHINE
Filed Feb. 15, 1965
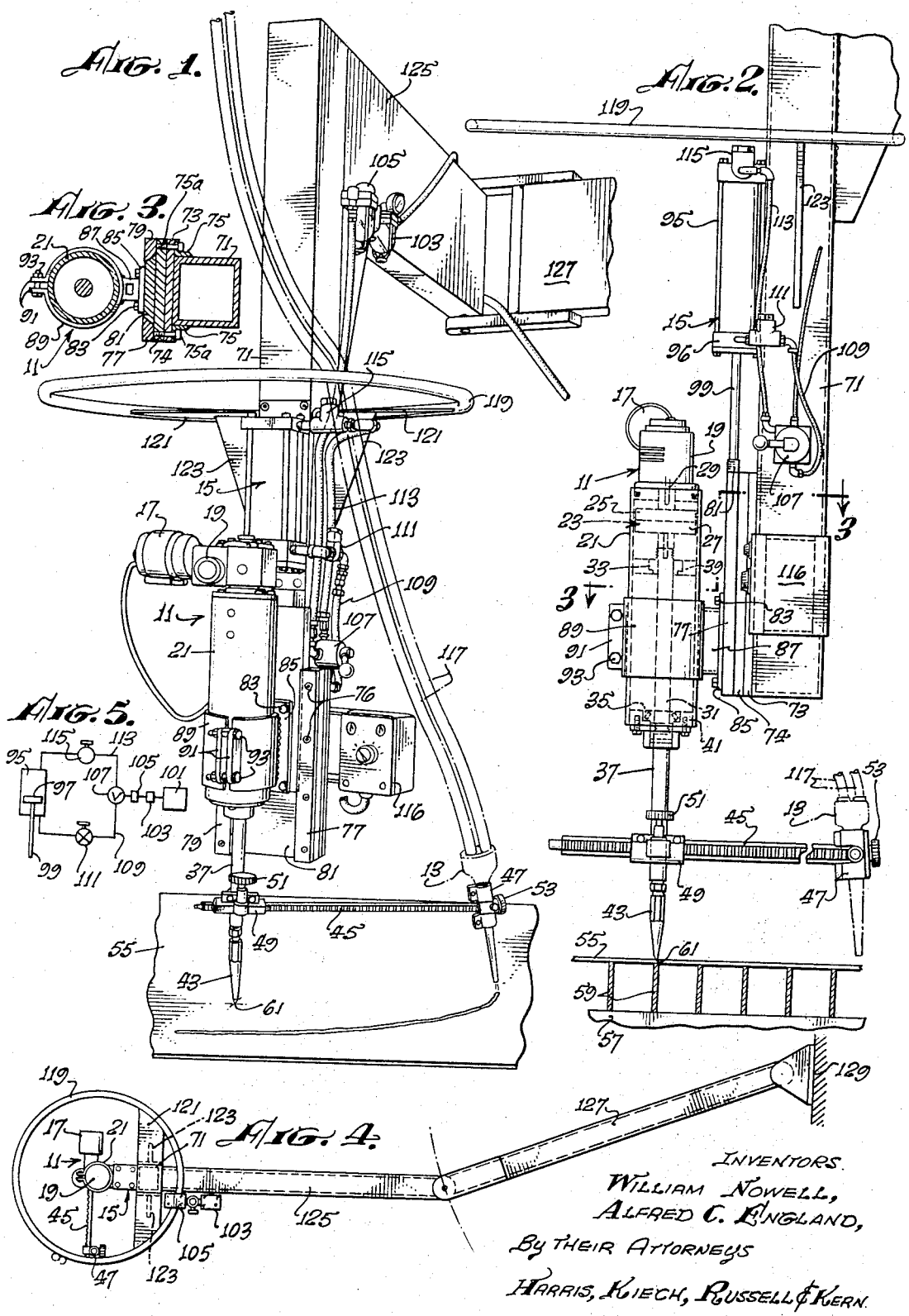
INVENTORS.
WILLIAM NOWELL,
ALFRED C. ENGLAND,
BY THEIR ATTORNEYS
HARRIS, KIECH, RUSSELL & KERN.

United States Patent Office 3,351,332
Patented Nov. 7, 1967

3,351,332
CIRCLE CUTTING MACHINE
William Nowell, 10316 Walnut, South Gate, Calif.
90280, and Alfred C. England, 734 Freeman Ave.,
Long Beach, Calif. 90804
Filed Feb. 15, 1965, Ser. No. 432,609
11 Claims. (Cl. 266—23)

ABSTRACT OF THE DISCLOSURE

A machine for supporting and rotating a cutting torch about a rotational axis where a first assembly mounts the torch and includes a motor for causing rotation of the torch and a second assembly adjustably mounts the first assembly and includes a motor for causing movement of the first assembly.

This invention relates to a machine for causing movement of a cutting torch along a predetermined path and, more particularly, to a circle cutting machine.

As is well known, cutting torches capable of producing considerable heat and high temperature are used to sever various metals. It is frequently necessary or desirable to use cutting torches to cut predetermined shapes such as circles from a metal plate and to provide a machine for moving the cutting torch in a path to cut such predetermined shapes. Several conventional machines for moving a cutting torch are not suited for rugged machine shop duty and do not cut perfect circles on a rapid mass production basis. The typical prior art machine does not have motors for causing rotation of the cutting torch and for moving the cutting torch assembly along a second path such as a vertical path. A cutting torch has flexible hoses leading thereto which become wound up or tangled as the cutting torch is moved in a circular path. The typical prior art machine provides no suitable means for unwinding or disentangling the hoses after the circle has been cut.

Accordingly, it is an object of this invention to provide a compact, rugged, heavy-duty machine for causing a cutting torch to move precisely along a selected path. More particularly, it is an object of this invention to provide such a machine which will move a cutting torch so as to cut a perfect circle from a metal plate.

Another object of this invention is to provide a machine having motor means for moving the cutting torch in several directions. More particularly, it is an object of this invention to provide an assembly including a first motor for rotating a cutting torch about a rotational axis and along a first path and a second motor for moving the assembly along a second path. In the preferred embodiment of the machine, the first path is circular and the second path is generally perpendicular to the plane of the circle.

A further object of this invention is to provide a machine for rotating a cutting torch along a predetermined path which permits relative rotation between the cutting torch and the means causing the rotation in response to the application of a predetermined torque properly applied across the machine. It is a particular object to provide a motor for rotating the cutting torch and a slip clutch for allowing the relative rotation.

Another object of this invention is to provide fluid operated means for quickly and efficiently raising and lowering a cutting torch assembly at various speeds. The fluid operated means raises and lowers the assembly without the need of rotary members.

Briefly stated, the objects of this invention may be accomplished by providing an assembly having mounting means for mounting a cutting torch for rotation in a first path about a rotational axis. The assembly also includes a first motor for driving the mounting means and the cutting torch in rotation and a slip clutch drivingly connected to the mounting means and the first motor means for allowing relative rotation therebetween in response to the application of a predetermined torque thereacross. A second motor is provided for causing movement of the assembly along a second path. In the preferred embodiment, the first path is generally circular and the second path is generally perpendicular to the plane of the circle. Also in the preferred construction, the second motor is a pneumatic motor and a valve is provided to regulate the flow of air thereto. Additional valves may be provided for controlling the rate of air flow to the pneumatic motor to vary the rate at which the pneumatic motor moves the assembly along the second path.

The invention, both as to its organization and method of operation, together with further objects and advantages thereof, may best be understood by reference to the following description taken in connection with the accompanying drawing:

In the drawing:

FIG. 1 is a perspective view in elevation of a machine for causing predetermined movement of a cutting torch constructed in accordance with the teachings of this invention and showing such a machine secured to positioning means;

FIG. 2 is a side elevation of the machine shown in FIG. 1;

FIG. 3 is a sectional view taken along line 3—3 in FIG. 2;

FIG. 4 is a plan view on a reduced scale of the machine and the positioning means shown in FIG. 1; and FIG. 5 is a schematic control diagram for the pneumatic motor.

The specific embodiment described herein includes a first assembly 11 (FIGS. 1 and 2) for rotating a cutting torch 13 in a first path and a second assembly 15 for causing movement of the first assembly along a second path. The first assembly 11 includes a reversible, variable speed, D.C. motor 17 having an integral gear reducer 19 secured to the upper end of a tubular metal housing 21. The tubular housing 21 is preferably cylindrical and the bore passing therethrough is also cylindrical.

The first assembly 11 includes a slip clutch 23 having the usual driving member 25 and driven member 27 and being suitably secured within an upper portion of the housing 21. The reducer 19 provides a short shaft 29 which is keyed to the driving member 25. The slip clutch is of a conventional type and will transmit rotation from the driving member 25 to the driven member 27 so long as the torque transmitted therebetween is below a predetermined level. However, when the torque reaches such predetermined level, the driving member 25 will slip relative to the driven member 27 and no rotational movement will be transmitted therethrough. This type of clutch, being well known in the prior art, is not described in detail herein, A Torco-stat slip clutch has been found particularly advantageous for use in this circle cutting machine.

Mounting means drivingly connected to the driven member 27 are provided for mounting the cutting torch 13 for rotation about a rotational axis along a predetermined path. Such mounting means form a portion of the first assembly 11 and include an elongated shaft 31 keyed to the driven member 27 and suitably supported within the housing 21 by bearings 33 and 35. The elongated shaft 31 has a longitudinal axis coinciding with the rotational axis of the cutting torch 13 and is mounted axially within the housing 21 with an exposed portion 37 extending downwardly from the bottom of the housing. The bearings 33 and 35 are secured within the housing 21 by suitable bearing blocks 39 and 41, respectively. A pointed rod 43 is threadedly secured in a recess in the lower end of the exposed portion 37.

The mounting means also includes an adjustable radius arm 45 and an adjustable torch holder 47. A retainer 49 having an adjusting knob 51 is rigidly secured to the exposed portion 37 and receives the adjustable radius arm 45. The adjustable radius arm 45 is a rack member and may be moved radially inwardly or outwardly in a conventional manner by turning the adjusting knob 51 thereby varying the distance between the rotational axis and the torch 13.

The torch holder 47 is similar to the retainer 49 and has an adjusting knob 53. The torch holder 47 receives either a racked portion of the cutting torch 13 or a racked bar which is secured to the cutting torch 13. By turning the adjusting knob 53 the elevation of the cutting torch 13 may be varied. As the retainer 49 and the torch holder 47 are both of conventional construction, they are not described in detail herein.

In using the machine, a metal plate 55 is supported in spaced relation from a support 57 by a plurality of vertical plates 59. Using a punch, an indentation 61 is formed in the plate 55, the indentation receiving the end of the pointed rod 43. The adjusting knobs 51 and 53 are then used to adjust the distance between the rotational axis and the cutting torch 13 and the vertical spacing between the cutting torch 13 and the plate 55, respectively. The motor 17 may then be employed to rotate the cutting torch 13 in a circular path about the rotational axis to cut a circle from the plate 55.

The second assembly 15 is provided for causing movement of the first assembly 11 along a second path. In the preferred embodiment illustrated, the first assembly 11 rotates the cutting torch 13 in a planar horizontal circular path and the second assembly 15 moves the first assembly vertically or perpendicularly to the plane of the circle cut by the cutting torch.

The second assembly 15 may be supported on any suitable structural member and in the specific embodiment illustrated is supported on an elongated vertical tube 71 having a square cross section. A vertical back plate 73 and a front plate 74 (FIGS. 2 and 3) are secured to the tube 71 by flanges 75 which are welded to the tube 71 and threaded fasteners 75a. Suitably secured to the front face of the front plate 74 by set screws 76 are two longitudinally extending gibbs 77 and 79 which along with the front plate 74 form a grooved mounting means of trapezoidal cross section. A slide member 81 of trapezoidal cross section is mounted for vertical movement between the gibbs 77 and 79 and the front plate 74, In the preferred embodiment illustrated, the slide 81 is mounted for movement in a plane generally parallel to the rotational axis of the cutting torch 13. Threaded fasteners 83 secure a mounting plate 85 to the front face of the slide member 81 and a connecting member or tube 87 is welded to the front face of the mounting plate 85.

Clamping means are provided for connecting the first assembly 11 to the slide member 81. The clamping means include a split cylinder 89 which is welded at one side to the tube 87 and provides a pair of apertured flanges 91 opposite the tube 87. The split cylinder 89 frictionally engages and supports the housing 21, the diameter of the split cylinder being adjustable by bolts 93. Thus, vertical movement of the slide member 81 moves the first assembly 11 vertically without any rotary motion.

Fluid motor means are provided for moving the slide member 81 vertically. The fluid motor includes a cylinder 95 mounted generally in the same plane as the slide member 81 and secured to an upper portion of the tube 71 by a bracket 96. A fluid responsive piston 97 (FIG. 5) is slidably mounted in the cylinder 95 and a connecting rod 99 is secured at one end to the piston and at the other end to the upper end of the slide member 81. Thus, movement of the piston 97 within the cylinder 95 causes movement of the slide member 81 and the first assembly 11.

Control means are provided for controlling the movements of the piston 97. Movement of the piston 97 is caused by fluid pressure, the fluid being either a liquid or a gas. In the embodiment described herein, the piston 97 is pneumatically operated. With reference to FIG. 5, air from a storage tank 101 passes through a water trap 103 and an air lubricator 105 which adds small quantities of oil to the air to lubricate the cylinder 95. The air under pressure passes from the lubricator 105 to a four-way air valve 107 and then either through a conduit 109 and a control valve 111 or a conduit 113 and a control valve 115 to the cylinder 95. The four-way valve 107 regulates air flow to the cylinder 95 to control the direction that the piston 97 moves. That is, when the valve 107 supplies air to the upper portion of the cylinder 95, it vents the lower portion of the cylinder 95 to allow the piston 97 to move downwardly. The control valves 111 and 115 control the rate of air flow to the cylinder 95 to vary the rate of movement of the piston 97. Thus, the rate and direction of piston movement are easily controlled. The four-way valve 107 and the control valves 111 and 115 are preferably manually operated. If desired, a suitable abutment (not shown) may be provided near the lower end of the front plate 74 to limit downward movement of the slide 81.

The electrical elements and controls for the motor 17 are housed in a control box 116 which is secured to the tube 71. These include a rectifier, a forward-reverse-off control, and speed control devices all of conventional design.

In use, the cutting torch 13 will have flexible hoses 117 leading thereto to supply the torch with the essentials for cutting the plate 55. Means are mounted above the housing 21 for keeping the hoses 117 away from the housing and the other components of the device. Such means include a large circular hoop 119 welded to a horizontal plate 121 which, in turn, is welded to two vertical plates 123 which are secured to the tube 71. The hoses 117 which typically run to the cutting torch 13 from overhead will engage the outer surface of the hoop 119 and be prevented from entangling with the components of the machine.

Of course, the cutting machine described herein may be suspended by any suitable apparatus. By way of illustration, a suitable supporting apparatus is illustrated in FIGS. 1 and 4. Such apparatus includes the vertical tube 71 which is suitably secured at the upper end thereof to an outer support arm 125. An inner support arm 127 is pivotally secured at one end to a supporting structure 129 and at the other end pivotally mounts the outer support arm 125. The post 71 and the support arms 127 and 129 must be constructed of strong material to adequately support the heavy duty cutting apparatus. The supporting apparatus illustrated is convenient because it permits easy positioning of the cutting machine in a horizontal plane.

The operation of the cutting machine is as follows. The metal plate 55 which is to be cut is horizontally positioned on the vertical plates 59 and the indentation 61 is punched therein. The support arms 125 and 127 are used to position the cutting machine over the plate 55, and by proper manipulation of the four-way valve 107 the first assembly 11 is lowered so that the pointed rod 43 engages the indentation 61. The adjusting knobs 51 and 53 are then used to adjust the radius of the circle to be cut and the spacing between the cutting torch 13 and the metal plate 55. If it is desired to begin cutting at a specific location on the metal plate 55, the slip clutch 23 will permit manual rotation of the cutting torch 13 and the mounting means therefor independent of the motor 17 to preposition the torch. The motor controls in the control box 116 are then operated to cause the motor 17 to move the cutting torch 13 in the desired direction and at the desired speed to accurately cut a circle from the metal plate 55. When the circle has been cut, the hoses 117 will have been turned through 360 degrees. Prior to cutting the next circle from the metal plate 55, it will be desirable to rotate the cutting torch and mounting means backward to unwind the hoses. It is an important feature of this invention that the slip clutch 23 will permit such a movement as well as the manual prepositioning of the cutting torch 13. The second assembly 15 will move the first assembly 11 vertically in order to accommodate supports 57 of varying heights and could be used to maintain proper spacing between the cutting torch 13 and the metal plate 55 when the upper surface of the latter is sloping.

An important feature of this invention is that the rotational movement of the cutting torch and the vertical movement of the first assembly 11 are accomplished automaticalllly by separate motor means thereby performing the cutting operation accurately and quickly. The fluid motor is well adapted for use in a circle cutting machine because of its relatively low cost, the variable speed with which it moves the first assembly 11, and the elimination of rack bar or a rotary threaded shaft to accomplish vertical movement.

Another important feature of this invention is the slip clutch 23 which allows relative rotation between the cutting torch 13 and the motor 17 in response to a predetermined torque. Thus, the slip clutch 23 allows accurate manual prepositioning of the cutting torch 13 and permits manual unwinding of the cutting torch and, hence, the hoses 117 after each cutting operation.

It should be understood that the teachings of this invention are not necessarily limited to a machine which will only cut circular shapes and the fluid motor need not necessarily move the first asembly 11 vertically. Although the machine is particularly adapted for use with a Plasmarc torch, other cutting torches may be used.

Many changes, modifications, and substitutions may be made by those having ordinary skill in the art without departing from the spirit and scope of the invention.

We claim:

1. A machine for causing predetermined movement of a cutting torch comprising:
   a first assembly for rotating the cutting torch, said assembly including mounting means for adjustably mounting the cutting torch for rotation in a first path about a rotational axis, first motor means for driving said mounting means and the cutting torch in rotation, and slip clutch means drivingly connected to said mounting means and said first motor means for allowing relative rotation therebetween in response to the application of a predetermined torque thereacross;
   a second path assembly for mounting said first assembly, including second motor means for causing movement of said first assembly along a second path; and
   means for moving said second assembly along a third path.

2. A machine as set forth in claim 1 wherein said second motor means is a fluid operated motor and means are provided to vary the rate of said movement along said second path.

3. A machine as defined in claim 1 wherein said first path is generally circular and said second path is generally perpendicular to the plane of the circle and said third path is in a plane generally parallel to the plane of the circle.

4. A machine for causing predetermined movement of a cutting torch comprising:
   an assembly for rotating the cutting torch, said assembly including mounting means for mounting the cutting torch for rotation about a rotational axis, first motor means for driving said mounting means and the cutting torch in rotation, and slip clutch means drivingly connected to said mounting means and said first motor means for allowing relative rotation therebetween in response to the application of a predetermined torque thereacross;
   means for mounting said assembly for movement along a predetermined path;
   pneumatic motor means for moving said assembly in both directions along said predetermined path;
   valve means for regulating flow of air to said pneumatic motor means to control the direction along said predetermined path that said pneumatic motor means moves said assembly; and
   control valve means for controlling the rate of air flow to said pneumatic motor means to vary the rate at which said pneumatic motor means moves said assembly.

5. A machine as defined in claim 4 wherein said pneumatic motor means includes a cylinder having a pneumatically operated piston slidable therein for moving said assembly along said predetermined path.

6. A machine for causing predetermined movement of a cutting torch comprising:
   a hollow housing;
   a motor and reducer mounted on said housing at one end thereof;
   an elongated shaft mounted in said housing and extending out of said housing at the other end thereof to form an exposed portion, said elongated shaft having a longitudinal axis;
   slip clutch means carried by said housing and connected to said reducer and said elongated shaft for allowing relative rotation therebetween in response to the application of a predetermined torque thereacross; and
   arm means for mounting the cutting torch to said exposed portion of said elongated shaft spaced from said longitudinal axis, said motor driving the torch in rotation about said longitudinal axis, said arm means and the cutting torch being manually rotatable about said rotational axis by the application of said predetermined torque thereto.

7. A machine as defined in claim 6 wherein a pointed rod extends axially from said exposed portion of said elongated shaft, said point being adapted to firmly fix said rotational axis by engaging a surface therebelow.

8. A machine as defined in claim 6 wherein said arm means is adjustable to vary the distance between the longitudinal axis and the cutting torch.

9. A circle cutting machine for causing predetermined movement of a cutting torch having hoses connected thereto and comprising:
   an assembly for rotating the cutting torch in a circle about a rotational axis including a hollow housing, a variable speed electric motor and a reducer mounted on said housing at one end thereof, an elongated shaft mounted in said housing and extending out of said housing at the other end thereof to form an exposed portion, said elongated shaft having a longitudinal axis coinciding with said rotational axis, slip clutch means mounted in said housing for allowing relative rotation between said elongated shaft and said reducer in response to the application of a predetermined torque thereacross, arm means of adjustable length for mounting the cutting torch to said exposed portion of said elongated shaft at a position spaced from said rotational axis, said motor driving the torch in rotation about said rotational axis, and a pointed rod extending axially of said exposed portion for engaging a surface therebelow;
   a slide member;
   grooved means mounting said slide member for movement in a plane generally parallel to said rotational axis;
   clamping means for connecting said assembly to said slide member;
   a cylinder mounted generally in said plane;
   a pneumatically operated piston slidable in said cylinder;

a piston rod connecting said piston and said slide member;

a four-way valve means for regulating air flow to said cylinder to control the direction that said piston slides in said cylinder;

control valve means for controlling the rate of air flow to said cylinder to vary the rate of movement of said piston; and means mounted above said housing for keeping the hoses away from said housing.

10. A machine for causing predetermined movement of a cutting torch comprising:

a first assembly for rotating the cutting torch about a cutting surface, said assembly including mounting means for mounting the cutting torch for rotation about a rotational axis, means for adjustably moving said torch toward and away from said cutting surface, first motor means for driving said mounting means and the cutting torch in rotation, and slip clutch means drivingly connected to said mounting means and said first motor means for allowing relative rotation therebetween in response to the application of a predetermined torque thereacross; and a second assembly for mounting said first assembly for movement along a predetermined path, said second assembly including second motor means for moving said first assembly in both directions along said predetermined path, the extension of said path intersecting the plane of said cutting surface.

11. A circle cutting machine for causing predetermined movement of a cutting torch comprising:

a first assembly for rotating the cutting torch in a circle about a rotational axis including a hollow housing, a variable speed electric motor and a reducer mounted on said housing at one end thereof, an elongated shaft mounted in said housing and extending out of said housing at the other end thereof to form an exposed portion, said elongated shaft having a longitudinal axis coinciding with said rotational axis, slip clutch means carried by said housing for allowing relative rotation between said elongated shaft and said reducer in response to the application of a predetermined torque thereacross, arm means of adjustable length for mounting the cutting torch to said exposed portion of said elongated shaft at a position spaced from said rotational axis, said arm means including means for adjustably mounting said torch, said motor driving the torch in rotation about said rotational axis, and a pointed rod extending axially of said exposed portion for engaging a surface therebelow;

a second assembly for mounting said housing for movement in a path generally parallel to said rotational axis, said second assembly including motor means for moving said housing in both directions along said path; and means for moving said second assembly in a plane generally perpendicular to said rotational axis.

References Cited

UNITED STATES PATENTS

| | | | |
|---|---|---|---|
| 874,702 | 12/1907 | Patton | 77—77 |
| 2,178,938 | 11/1939 | Ohmstede | 266—23 |
| 2,380,357 | 7/1945 | Ziebolz | 33—23 |
| 2,499,938 | 3/1950 | Ward | 266—23 |
| 2,622,667 | 12/1952 | Hinton | 266—23 |
| 2,696,940 | 12/1954 | Anderson | 64—30 X |

FOREIGN PATENTS 120,298  8/1945  Australia.

J. SPENCER OVERHOLSER, *Primary Examiner.*

E. MAR, *Assistant Examiner.*